US009225721B2

(12) United States Patent
Keitel et al.

(10) Patent No.: US 9,225,721 B2
(45) Date of Patent: Dec. 29, 2015

(54) DISTRIBUTING OVERLAY NETWORK INGRESS INFORMATION

(71) Applicant: Google Inc., Mountain View, CA (US)

(72) Inventors: Thomas Christoph Keitel, San Jose, CA (US); Edward Thomas Lingham Hardie, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/161,236

(22) Filed: Jan. 22, 2014

(65) Prior Publication Data

US 2014/0137267 A1  May 15, 2014

Related U.S. Application Data

(62) Division of application No. 13/297,626, filed on Nov. 16, 2011, now Pat. No. 8,862,753.

(51) Int. Cl.
*H04L 9/00* (2006.01)
*H04L 29/06* (2006.01)
*G06F 11/00* (2006.01)
*G06F 15/173* (2006.01)
*H04L 29/12* (2006.01)

(52) U.S. Cl.
CPC .............. *H04L 63/10* (2013.01); *H04L 63/029* (2013.01); *H04L 63/0272* (2013.01); *H04L 63/08* (2013.01); *H04L 61/1511* (2013.01)

(58) Field of Classification Search
CPC .... H04L 63/10; H04L 63/0272; H04L 63/029
See application file for complete search history.

(56) References Cited

U.S. PATENT DOCUMENTS

| 6,643,778 | B1* | 11/2003 | Nakazawa ...................... 726/11 |
| 6,981,156 | B1 | 12/2005 | Stern et al. |
| 7,890,612 | B2 | 2/2011 | Todd et al. |
| 7,890,759 | B2 | 2/2011 | Takeyoshi et al. |
| 8,307,419 | B2 | 11/2012 | Richardson et al. |
| 8,332,464 | B2* | 12/2012 | Dispensa et al. ............... 709/203 |
| 2002/0169980 | A1* | 11/2002 | Brownell ....................... 713/201 |
| 2003/0110273 | A1 | 6/2003 | Ventura |
| 2003/0167403 | A1 | 9/2003 | McCurley et al. |

(Continued)

OTHER PUBLICATIONS

International Search Report and Written Opinion dated Mar. 18, 2013 for Application No. PCT/US2012/065163.

(Continued)

*Primary Examiner* — Wen-Tai Lin
(74) *Attorney, Agent, or Firm* — Edward A. Gordon; Foley & Lardner LLP

(57) ABSTRACT

Aspects of the present disclosure relate to providing secure access to resources of a private network. For example, a client device may transmit a request identifying the protected resource to an authentication server. The authentication server queries a network address lookup table to identify a network address of the protected resource based on the identifying information of the request. If the network address denotes a network location that is not generally accessible, the authentication server generates a resource record that identifies a bastion host, a port, and a connection method for accessing the protected resource. The resource record and the network address may then be transmitted to the client device. In response, the client device may use the information in the resource record to establish a tunnel connection with the bastion host, and the client device uses the tunnel connection to access the protected resource via the bastion host.

18 Claims, 9 Drawing Sheets

(56) References Cited

U.S. PATENT DOCUMENTS

| | | | |
|---|---|---|---|
| 2005/0060328 A1* | 3/2005 | Suhonen et al. | 707/100 |
| 2007/0011733 A1 | 1/2007 | Gbadegesin et al. | |
| 2008/0178278 A1 | 7/2008 | Grinstein et al. | |
| 2008/0201486 A1* | 8/2008 | Hsu et al. | 709/238 |
| 2009/0133115 A1 | 5/2009 | Heninger et al. | |
| 2009/0193126 A1 | 7/2009 | Agarwal et al. | |
| 2010/0081417 A1 | 4/2010 | Hickie | |
| 2012/0084838 A1* | 4/2012 | Inforzato et al. | 726/4 |

OTHER PUBLICATIONS

"Anycast" [online], <en.wikipedia.org/wiki/anycast>, Jul. 2, 2013, 5 pages.

"Distributing Authoritative Name Servers Via Shared Unicast Addresses", [online], <www.rfc.base.org/bxt/rfc-3258.txt>, Apr. 2002, 11 pages.

"Shared Unicast for Secondary DNS: A More Robust DNS Service Under .MX", Network Information Center México, 2004, 13 pages.

Kevin Miller, Deploying IP Anycast, Carnegie Mellon Network Group, NANOG 29, Oct. 2003, 83 pages.

Dmitri Dmitrienko: Remote Files Sharing by Windows or Samba over SSH tunnel, Dec. 28, 2010 Retrieved from URL: https://web.archive.org/web/20101228205842/http://www.nusphere.com/products/remote file ssh.htm [retrieved on Jun. 12, 2015].

Liu Hao et al: "The study and design on secure-cloud storage system", Electrical and Control Engineering (ICECE), 2011 International Conference on, IEEE, Sep. 16, 2011, pp. 5126-5129.

Partial supplementary European Search Report mailed Jun. 22, 2015 in European Patent Application No. 12849659.3.

Tom's Hardware Forum "How to set up online file sharing server", Feb. 19, 2011, Retrieved from the URL: http://www.tomshardware.co.uk/forum/33412-42-online-file-sharing-server [retrieved on Jun. 11, 2015].

* cited by examiner

DISTRIBUTING OVERLAY NETWORK INGRESS INFORMATION

CROSS REFERENCE

The present application is a divisional of U.S. patent application Ser. No. 13/297,626, filed Nov. 16, 2011, now U.S. Pat. No. 8,862,753, the disclosure of which is incorporated herein by reference.

The present application is a divisional of U.S. patent application Ser. No. 13/297,626, filed Nov. 16, 2011, the disclosure of which is incorporated herein by reference.

BACKGROUND OF THE INVENTION

A typical Virtual Private Network ("VPN") connects client devices to a particular tunnel end point within a private or internal network and from this end point provides general access to the resources available within that network. For example, VPN networks typically provide a single tunnel end point per client device. This end point may be configured when the VPN connection is initially opened. Once the tunnel between the internal network and the client device has been successfully connected, the client device may access the internal network's resources (data, applications, etc.) a an internal view of any split domain name server ("DNS").

These VPN connections may be somewhat limited in that they require the VPN to be connected prior to accessing the resources or data hosted within the internal network. In some examples, the user may experience various failures such as when a DNS name resolution results in a negative result (NXDOMAIN) because the name is not made known on that side of the split DNS and the application reports "host unreachable" or "service unavailable." This may occur where the DNS information has been cached but the resource is not reachable prior to the VPN being up. Such failures may commonly require direct user intervention. In addition, the configuration method may also significantly limit the granularity of the security or require additional configuration by the administrator of the internal network in order to limit reachability after the client devices have sent and received information by way of the tunnel. In other examples, where these additional configurations have been achieved (for example, by assigning different VPN users to different VLANs), these configurations may be per client device or user rather than for a specific application.

SUMMARY

Aspects of the disclosure relate generally to distributing network ingress information. More specifically, one aspect of the disclosure describes a computer-implemented method for accessing a protected resource of a first network. The method includes transmitting, over a second network, a request identifying the protected resource. A resource record is received from an authentication server. The resource record identifies a bastion host, a port, and a connection method. A request is transmitted to the port based on the connection method. A processor establishes a tunnel connection with the bastion host. The protected resource is accessed via the tunnel connection and the bastion host.

In one example, the first network is a private network and the second network is a public network. In another example, the authentication server is a DNS server that provides network addresses in response to queries from client devices. In another example, the protected resource is accessed without allowing access to another resource of the private network. In another example, the first network includes shared network space.

Another aspect of the disclosure provides a computer-implemented method for providing a resource record for reaching a protected resource of a first network. The method includes receiving, over a second network from a client device, a request identifying the protected resource. Memory is queried in order to identify a network address of the protected resource. A processor determines whether the protected resource is generally accessible based on the identified network address, wherein a resource is generally accessible if it does not in shared address space. If the protected resource is not generally accessible, reachability information for the protected resource is identified. Additional is generated based on the reachability information. The additional information and the network address are transmitted to the client device.

In one example, the additional information includes a resource record identifying a computer, a port for the computer, and a connection method. In this example, the connection method identifies a method the client device uses to access the protected resource.

A further aspect of the disclosure provides a computer-implemented method for accessing a publically available resource of a first, public network. The method includes transmitting, over a second, private network, a request identifying the public resource. Information identifying a bastion host, a port, and a connection method is received from an authentication server. A processor generates a request to access the public resource based on the connection method. The request is transmitted to the port in order to establish a tunnel connection between the bastion host and the public resource. The public resource is accessed via the tunnel connection and the bastion host.

In one example, the authentication server is a DNS server that provides network addresses in response to queries from client devices associated with network locations within the first, private network. In another example, the second network includes shared network space. In another example, the method also includes, before transmitting the additional information, encrypting the additional information to obtain encrypted additional information, and wherein transmitting the additional information includes transmitting the encrypted additional information.

Still another aspect of the disclosure provides a computer-implemented method for providing a resource record for reaching a private resource of a first network. The method includes receiving, over a second network from a client device, a request identifying the public resource. Memory is queried to identify a network address of the protected resource. A processor determines whether the protected resource is within the second network based on the identified network address. If the protected resource is not within the second network, reachability information for the protected resource is identified. Additional data is generated based on the reachability information. The additional information and the network address is transmitted to the client device.

In one example, the additional information includes a resource record identifying a computer, a port for the computer, and a connection method. In another example, the connection method identifies a method the client device uses to access the protected resource. In another example, the first network is a private network and the second network is a public network.

Yet another aspect of the disclosure provides a computer. The computer includes memory storing network addresses of resources and associated reachability information. The computer also includes a processor coupled to the memory. The processor is configured to receive, over a second network from a client device, a request identifying a protected resource of a first network; querying the memory to identify a network address of the protected resource; determine whether the protected resource is generally accessible based on the identified network address, wherein a resource is generally accessible if it does not in shared address space; if the protected resource is not generally accessible, identify from the memory reachability information for the protected resource; generate additional information based on the reachability information; and transmit the additional information and the network address to the client device.

In one example, the processor is also configured to generate the additional information that includes a resource record identifying a computer, a port for the computer, and a connection method. In this example, the connection method identifies a method the client device uses to access the protected resource. In another example, the processor is also configured to, before transmitting the additional information, encrypt the additional information to obtain encrypted additional information, and wherein the processor is configured to transmit the additional information by transmitting the encrypted additional information.

DETAILED DESCRIPTION

In one example, a client device may transmit a request including information identifying a protected resource. An authentication server may then receive and authenticate the request. The authentication server queries a network address lookup table to identify a set of one or more network addresses for the protected resource based on the identifying information of the request. The authentication server may determine whether the set of one or more network addresses denotes a network location or locations that are generally accessible. For each address of the set of one or more networks addresses that is not generally accessible, the authentication server identifies reachability information that identifies a computer such as a bastion host, a port, and a connection method for accessing the protected resource. The reachability information may be used to generate a resource record. The resource record or records and the set of one or more network addresses may then be transmitted to the client device.

The client device may receive the resource record or records and the set of one or more network addresses. In response, the client device may transmit a request to access the protected resource based on the information of each of the resource records. These requests may be received by other computers such as bastion hosts (identified in the resource record) and verified. The bastion host and client device then establish a tunnel connection (or multiple tunnel connections depending upon), and the client device may use the tunnel connection to access the protected resource via the bastion host.

Figure 1:
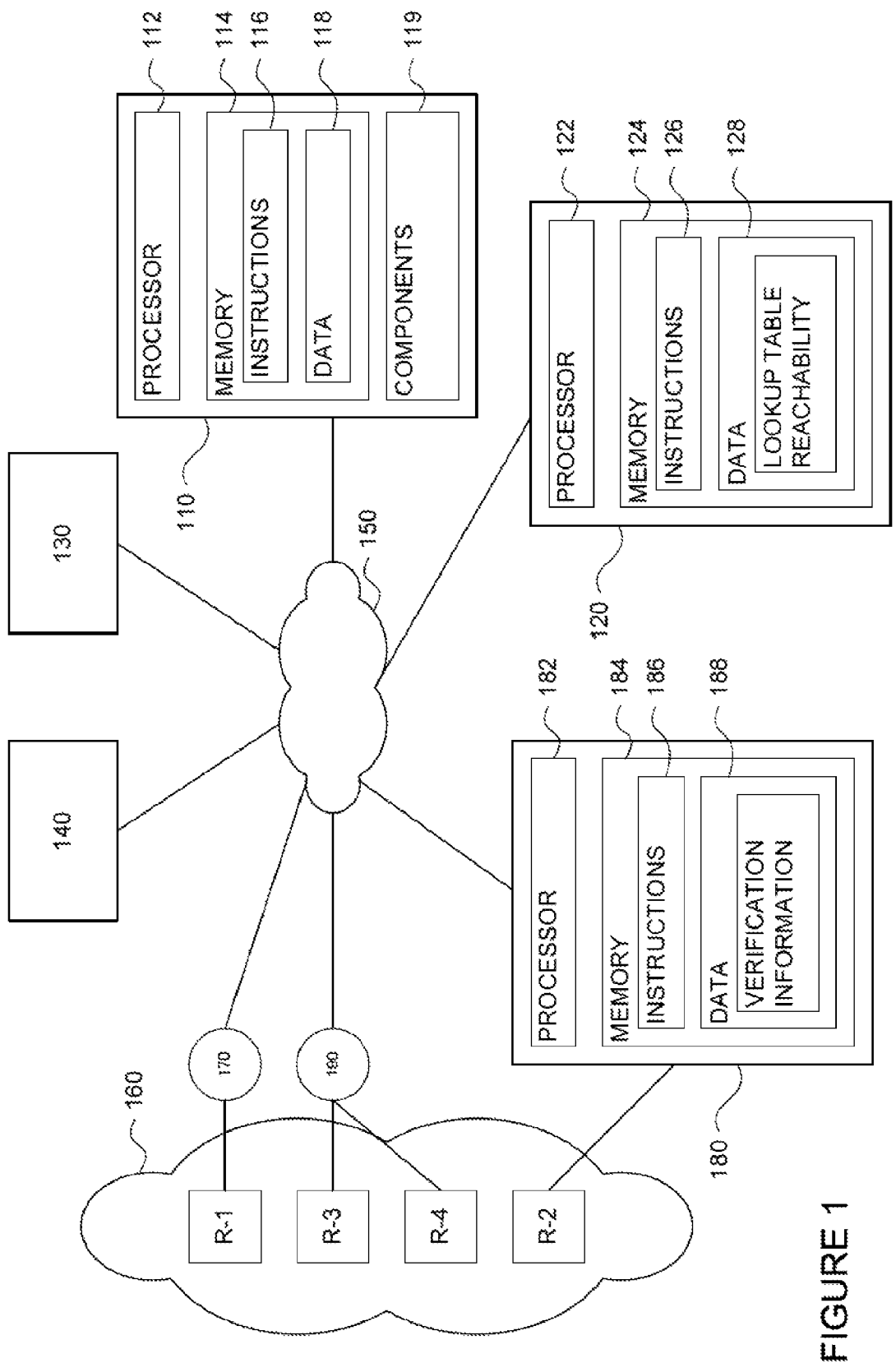
FIG. 1 is a functional diagram of a system in accordance with aspects of the disclosure.
Figure 2:
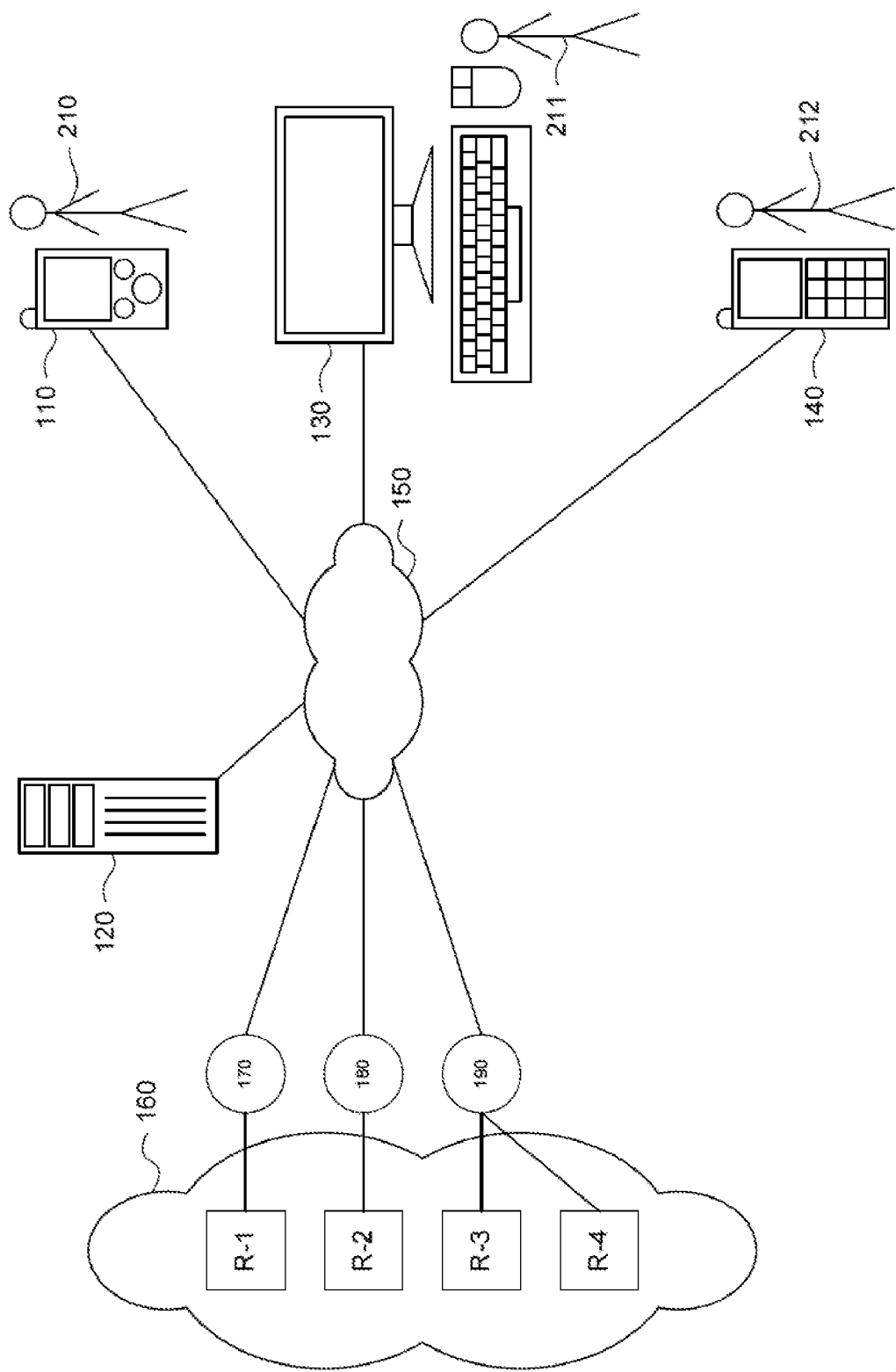
FIG. 2 is a pictorial diagram of the system of FIG. 1.

As shown in FIGS. 1-2, an exemplary system 100 may include computers 110, 120, 130 and 140. Computer 110 may contain a processor 112, memory 114 and other components typically present in general purpose computers. Memory 114 of computer 110 may store information accessible by processor 112, including instructions 116 that may be executed by the processor 112.

Memory may also include data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 112 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor, computer, or memory will be understood to include references to a collection of processors, computers, or memories that may or may not operate in parallel.

The computer 110 may be at one node of a network 150 and capable of directly and indirectly communicating with other nodes of the network. For example, computer 110 may comprise a client device that is capable of communicating with other devices, such as a server 120 and bastion hosts 170, 180, 190 via network 150. In this regard, server 120 and bastion hosts 170, 180, 190 may send information to and receive information from client devices 110, 130, and 140.

Server 120 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 120.

Each of client devices 130, 140 may be configured similarly to the client device 110, with a processor, memory, instructions, and data (similar to processor 112, memory 114, instructions 116, and data 118). Each client device 120, 130, 140 may be a personal computer, intended for use by a person 210-12, having all the components 119 normally found in a personal computer such as a central processing unit (CPU), display device (for example, a monitor having a screen, a projector, a touch-screen, a small LCD screen, a television, or another device such as an electrical device that is operable to display information processed by the processor), CD-ROM, hard-drive, user inputs (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 110, 130, 140 may comprise a full-sized personal computer, the system and method may also be used in connection with mobile devices capable of wirelessly exchanging data with a server over a network such as the Internet. By way of example only, client device 140 may be a wireless-enabled PDA, hand-held or in-car navigation device, tablet PC, netbook, or a cellular phone capable of obtaining information via the Internet. The user may input information, for example, using a small keyboard, a keypad, or a touch screen.

Similar to client devices 110, 140, and 130, computer 120 may comprise a server including a processor 122, memory 124, instructions 116, and data 118 as described above. Server 120 may authenticate requests for information. For example, the authentication server may be a DNS server. In this example, data 118 may include an DNS or IP address lookup table which maps associations between domain names and IP addresses. In this regard, in response to receiving a request identifying a domain name, for example "www.a.com," from a client device 110, 130, or 140, DNS 120 may provide the requesting node with a set of one or more IP addresses. The IP addresses and network addresses used herein are not limited to specific IP address families (such as IPv4 or IPv6) and may be used with various protocols. As described in more detail below, data 118 may also include reachability information used to generate additional information to be sent to client devices.

Bastion hosts 170, 180, and 190, may also be configured similarly to DNS 120 and client devices 110, 130, and 140. For example, bastion host 180 may include a processor 182, memory 184, instructions 186, and data 188 as described above. Though not shown, bastion hosts 170 and 190 may also include these features. Each bastion host may provide access to one or more resources R1-R4. As shown in FIGS. 1 and 2, bastion host 170 may be associated with resource R-1, bastion host 180 may be associated with resource R-2, and bastion host 190 may be associated with resources R-3 and R-4. As described in more detail below data 118 of bastion host 180 may include verification information used by the bastion host to allow or deny access to a resource such as resources R1-R4 associated with a network 160.

Each of resources R1-R4 may be located at a different node of network 160. For example, the IP address and port for each of these resources may be distinct. It will be understood that the same IP address may serve different resources on different ports and that tunnel connections serving these resources will be distinct. In order for the bastion host to create distinct tunnel connection to the different resources, the resources must be distinguishable at the network layer (here, by address and port).

Resources R1-R4 may include various computer programs, applications, data, etc. that are associated with network 160. For example, R1 may include an application for modeling financial information. R2 may include an email server at which one or more email accounts may be accessed. R3 may include a program or application for viewing, preparing or editing documents while R4 may include some memory for storage of the aforementioned documents.

The DNS 120, bastion hosts 190, 180, and 190, and client devices 110, 130, 140 are capable of direct and indirect communication, such as over network 150. Each of these computers may be associated with a network location identified such as an IP address for a network location of the Internet. Although only a few computers are depicted in FIGS. 1-2, it should be appreciated that a typical system can include a large number of connected computers, with each different computer being at a different node of and associated with a network location identifier for the network 150.

The networks 150, 160 and intervening nodes described herein, may be interconnected using various protocols and systems, such that each may be part of the Internet, World Wide Web, specific intranets, wide area networks, or local networks. These may use standard communications protocols or those proprietary to one or more companies, Ethernet, WiFi and HTTP, and various combinations of the foregoing. For example, network 160 may be a private internet or intranet for a business or other entity while network 150 may be a public network such as the Internet. Private network 160 may therefore not be generally reachable by computers or devices of network 150, as private network 160 may be in shared address space as described in RFC 1918 or may be otherwise isolated.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single computer having a single processor, various aspects of the system and method may be implemented by a plurality of computers, for example, communicating information over network 150.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

Figure 3:
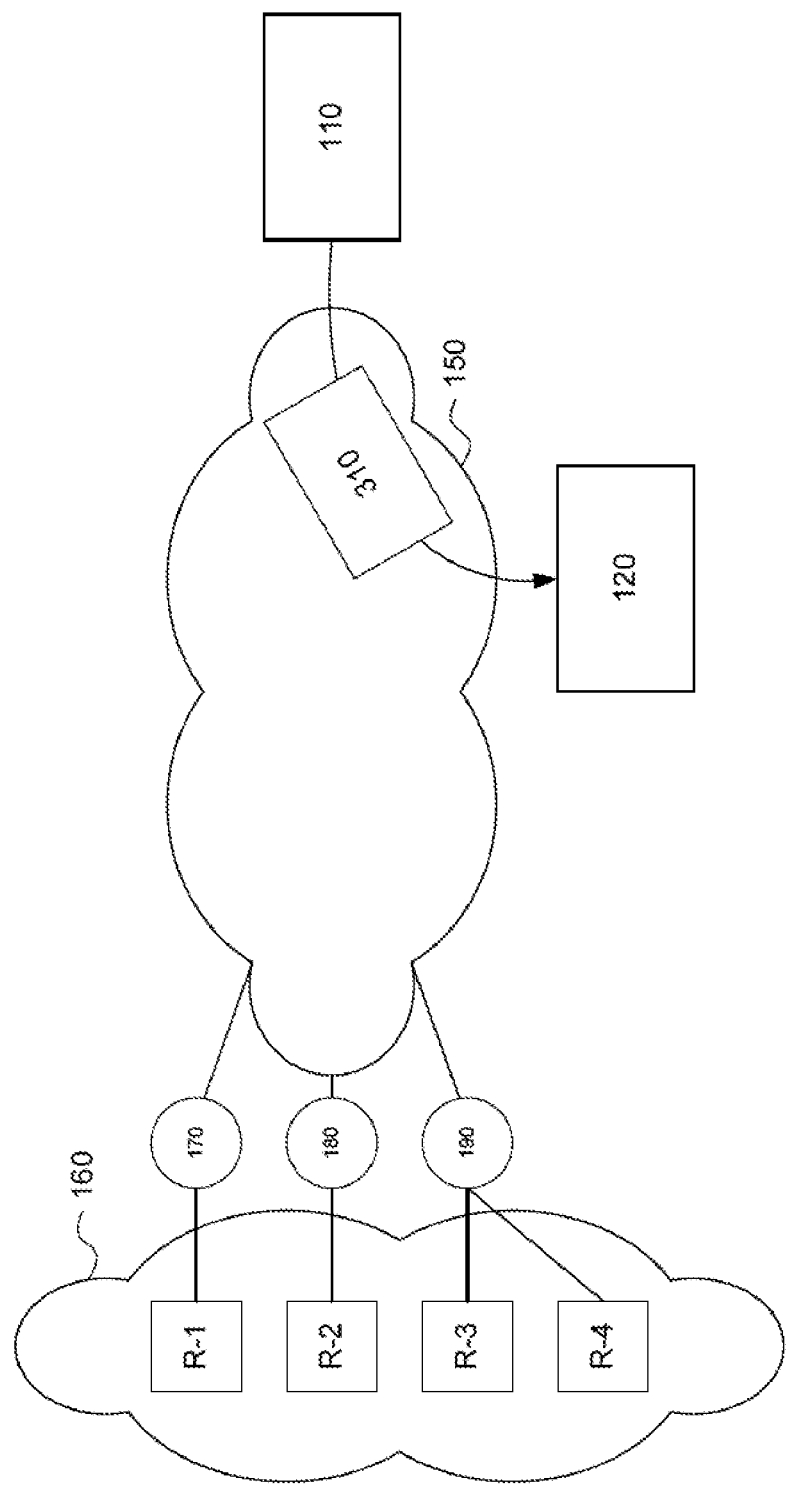
FIG. 3 is another diagram of the system of FIG. 1.

A user may want to access a resource maintained at a private network. For example, as shown in FIG. 3, a user of client device 110 may want to access a resource such as resource R2 of private network 160 (see FIGS. 1 and 2). Although resources R1-R4 may be available though network 150, these resources may be protected resources in that they are not be accessed or utilized by the user of the client device until the client device establishes a tunnel connection with the appropriate bastion host as described below.

A client device may generate a request for the network location of a resource maintained at a private network. For example, a DNS client incorporated into the operating system of the client device or a browser used by the user may generate the request. The request may be generated according to an authentication protocol such as a Secret Key Transaction Authentication for DNS ("TSIG") signed query for the A and AAAA records as discussed in RFC 2845.

In one example, the authentication server may comprise a plurality of geographically distributed servers. For example, the authentication server receiving the query may select the set of one or more servers to forward the request based on one or more of the authenticated identify, the IP address of the requesting client device, and the load on the authentication servers.

The request may include information identifying a resource and requesting the network location of the resource. For example, as shown in FIG. 3, request 310 may identify resource R-2 as "resource_r2.internal.corp.example." For example, if the request is transmitted using DNS, the client device may utilize the following elements in a DNS query tuple: <query name, type, class, server IPaddress>. In the above example, the request may include <resource_r2.internal.corp.example, A, IN, IP address of the DNS server>, where A is the resource record type of an IPv4 address and IN is the Internet DNS class.

Although authentication is not necessary, the authentication server may receive and authenticate the request. For example, DNS 120 may be configured to authenticate queries for resources at internal.corp.example using the method described in RFC 2845.

The authentication server may determine whether the resource identified in the request is with within a network that is not generally reachable. For example, the DNS 120 may query the lookup table and identify an IP address for the resource R-2. The server may then determine whether the resource is generally reachable, for example based on whether the identified IP address is within the RFC 1918 space. In another example, the reachability of a particular network address may be included in the lookup table. If the identified network location is generally reachable, the authentication server may transmit the identified network location to the requesting client device and the client device may use this information to access the resource directly.

If the identified network location is not generally reachable, the authentication server may also identify a reachability method for the identified network location and generate additional data (described in more detail below) to be transmitted to the client device. For example each network address that is not generally accessible may be associated with reachability information. This reachability information may be included, for example, in the general DNS lookup table, a second lookup table, or some other storage location. For example, resource R-2 may be located within private network 160 which may be in shared network space as described above and thus, not generally reachable. In this example, DNS 120 may identify a reachability method based on information associated with the network location of the resource R-2.

Once the network address and the reachability method are identified, the authentication server may generate additional data. For example, the additional data may define the connectivity method for reaching the network address of the resource identified in the request. The additional data may be packaged into a resource record such as a private use resource record, a URI in a URI resource record, or some other resource record dedicated to the purpose of providing the additional data. For a typical DNS resource record, the data may include the name, type, class, TTL (time to live or the length of time for which the information is valid), resource record length, and resource record data. In one example, the additional data may be appended to a the additional data section of the reply to the original request and may include the DNS name, port, and a tunnel connection method for the resource. The additional data may also be secured using various protocols such as TSIG, domain name security systems extension, etc. or a combination of such protocols.

Figure 4:
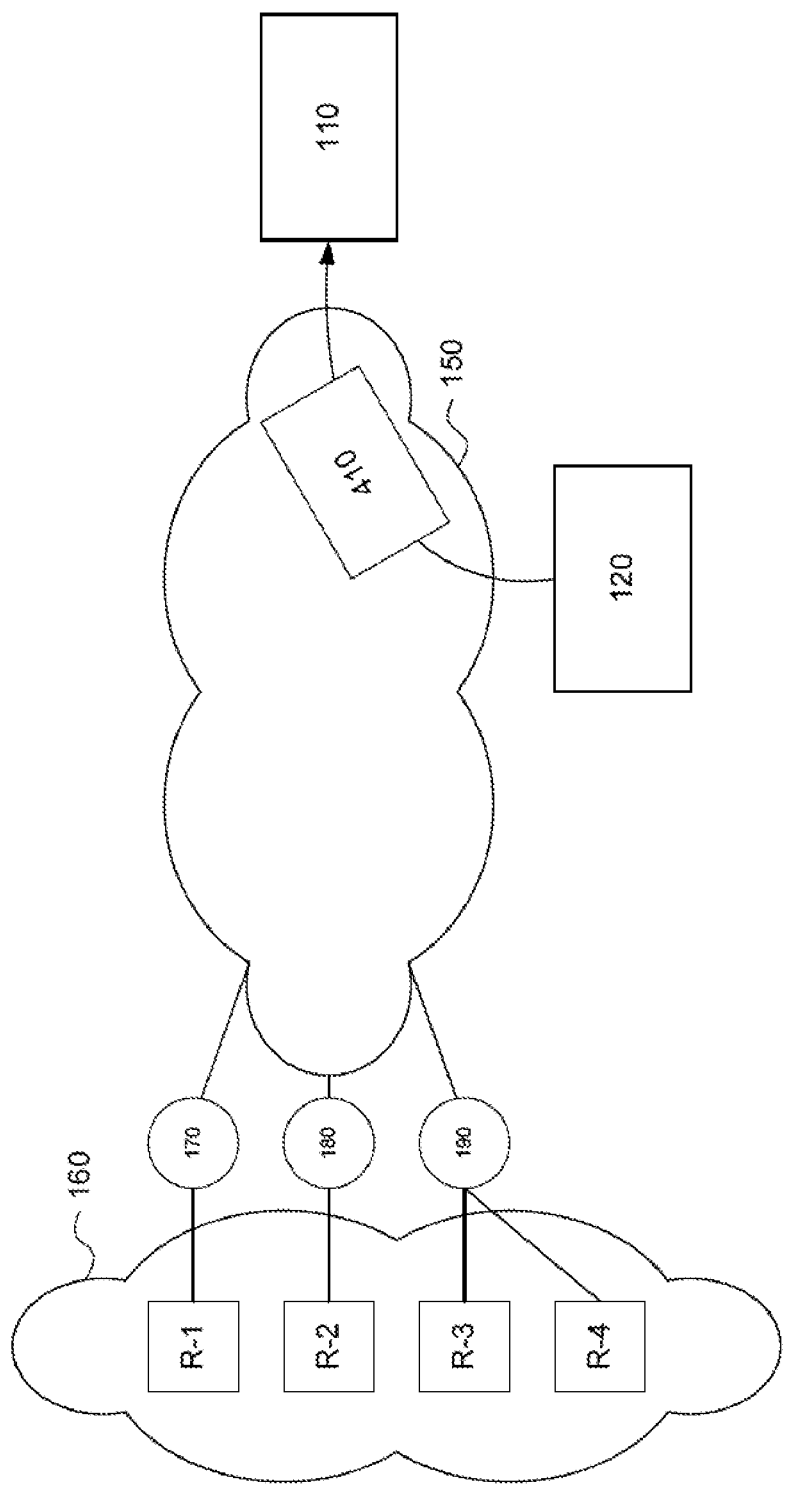
FIG. 4 is a further diagram of the system of FIG. 1.

The authentication server may then transmit the identified network address as well as the as the additional data to the requesting client device. For example, the data provided to the client device may include the initial request, the response, and the additional data. As shown in FIG. 4, DNS 120 may transmit response 410 to client device 110. Response 410 may include the original request 310, the resource record, and the additional data identifying bastion host 180, a port for the bastion host, and a connection method.

The identified connection method may include instructions for gaining access to the resource identified in the request. For example, the connection method may include instructions to present authentication information such as a certificate, a key, password, or other information to the identified port.

Figure 5:
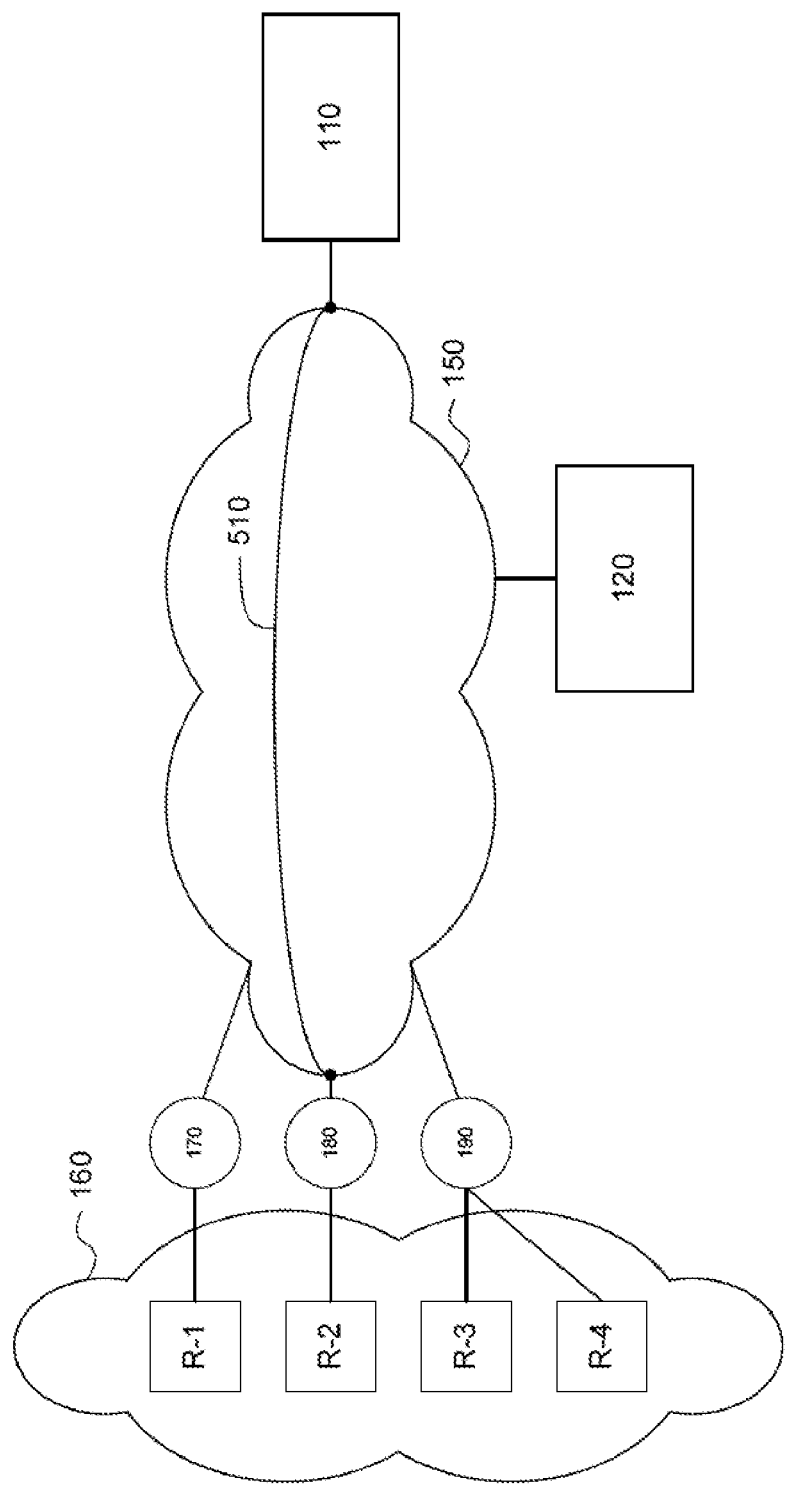
FIG. 5 is yet another diagram of the system of FIG. 1.

The client device may receive the response and use the additional data to set up a connection. For example, if the additional data has been encrypted, the client device may decrypt the additional data in order to access the information additional data identifying bastion host 180, the port for the bastion host, and the connection method. As shown in FIG. 5, client device 110 may then request to connect to resource R-2 via bastion host 180 by way of the connection method identified in the response 410. Bastion host 180 may verify the request based on the connection method used by client device 110. If the request is not verified, the bastion host 180 may deny the client device access to the resource R-2. If the request is verified, the bastion host may establish connection 510 between the bastion host and the client device. In one example, connection 510 may be a tunnel connection though network 150.

Figure 6:
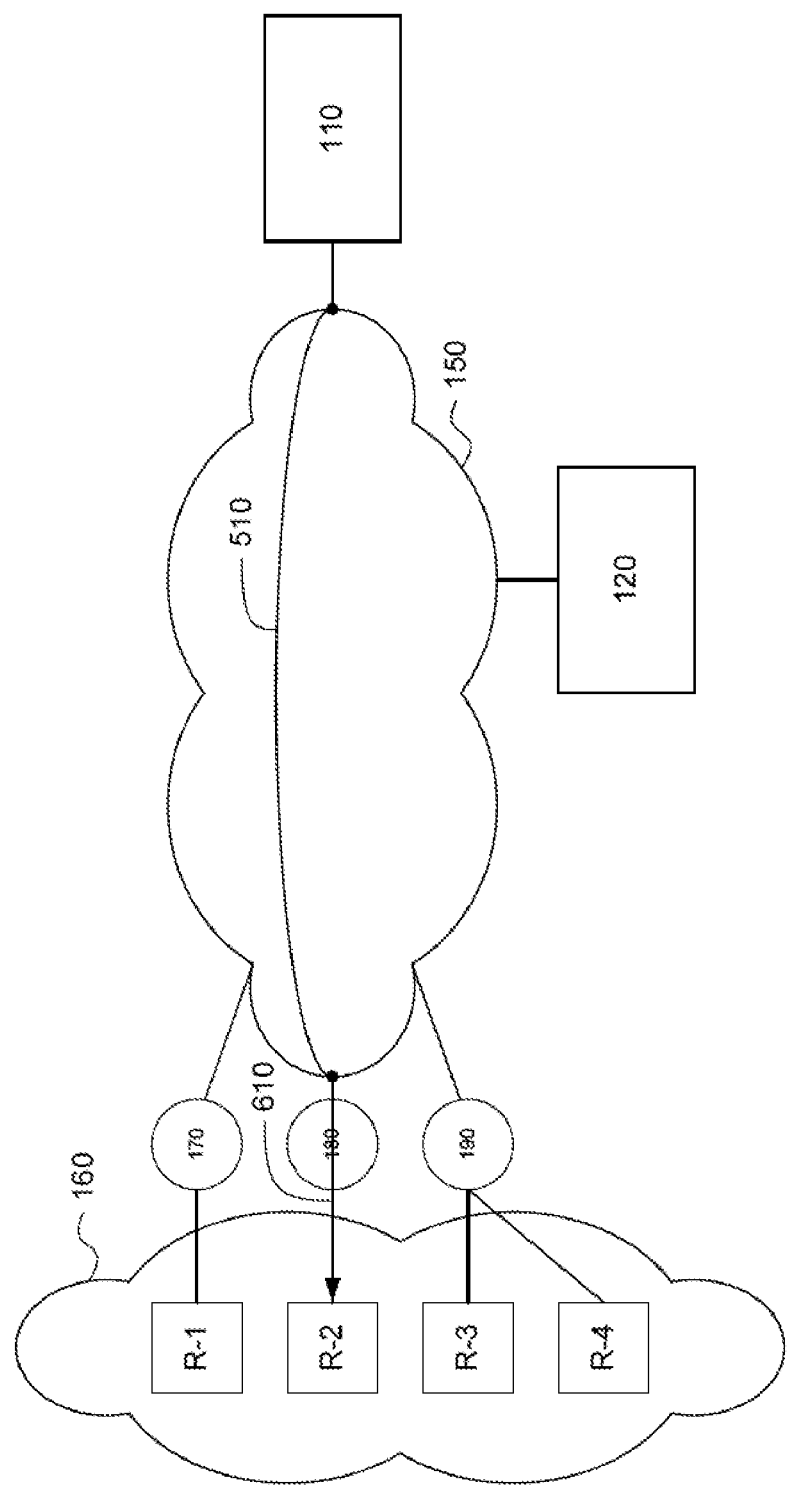
FIG. 6 is a further diagram of the system of FIG. 1.

Once the connection has been successfully established, the client may use the connection to access the resource. For example, the client device may use the overlay network interface of the tunnel to establish an application layer connection 610 to resource R-2 at scheme:// resource_R2.internal.corp.example, as shown in FIG. 6.

Figure 7:
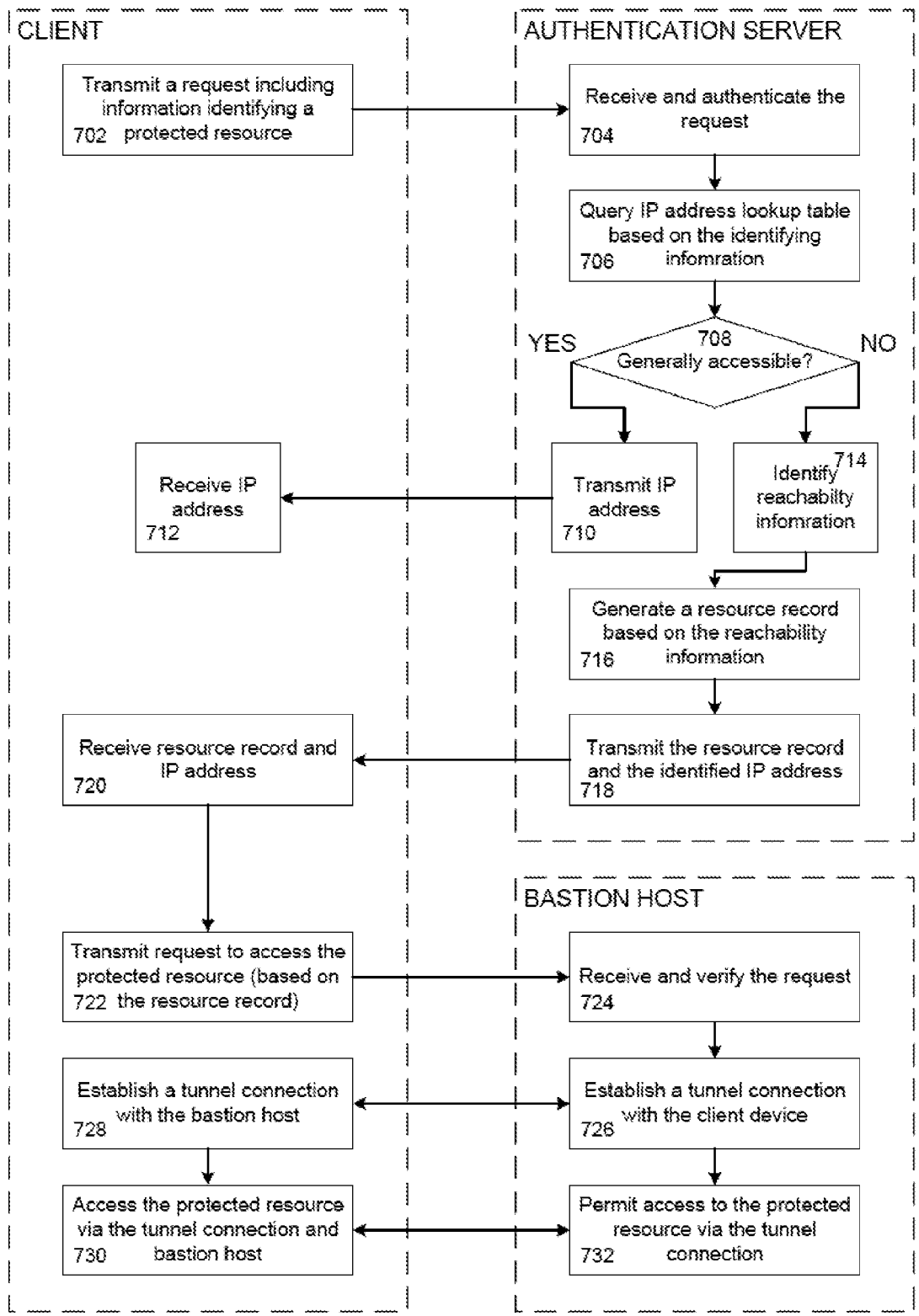
FIG. 7 is a flow diagram in accordance with aspects of the disclosure.

FIG. 7 is an example flow diagram depicting some of the features of the process described above. For example, a client device transmits a request including information identifying a protected resource at block 702. An authentication server receives and authenticates the request as described above. The authentication server then queries an IP address lookup table to identify an IP address of the protected resource based on the identifying information of the request at block 708. The authentication server then determines whether the IP address denotes a network location that is generally accessible at block 708. If so, the authentication server transmits the IP address back to the requesting client device at block 710. The client device receives the IP address at block 712. In this example, the resource is not actually a protected resource, but may be accessed directly by the client device by using the IP address received from the authentication server.

Returning to block 708, if the IP address is not generally accessible, the authentication server identifies reachability information at block 714. As described above, the reachability information may identify a bastion host, a port, and a connection method. The reachability information is then used to generate a resource record including additional data identifying the reachability information at block 716. As noted above, the additional data portion of the resource record may also be encrypted. Next, the resource record and the identified IP address are transmitted to the client device at block 718.

The client device then receives the resource record and the IP address at block 720. If the additional data has been encrypted, the client device may also decrypt the additional data. The client device transmits a request to access the protected resource based on the information of the resource record at block 722. This request is then received by the bastion host (identified in the resource record) and verified at block 724. The bastion host and client device then establish a tunnel connection at blocks 726 and 728. The client device then uses the tunnel connection to access the protected resource via the tunnel connection and the bastion host that permits access to the protected resource at blocks 730 and 732.

Figure 8:
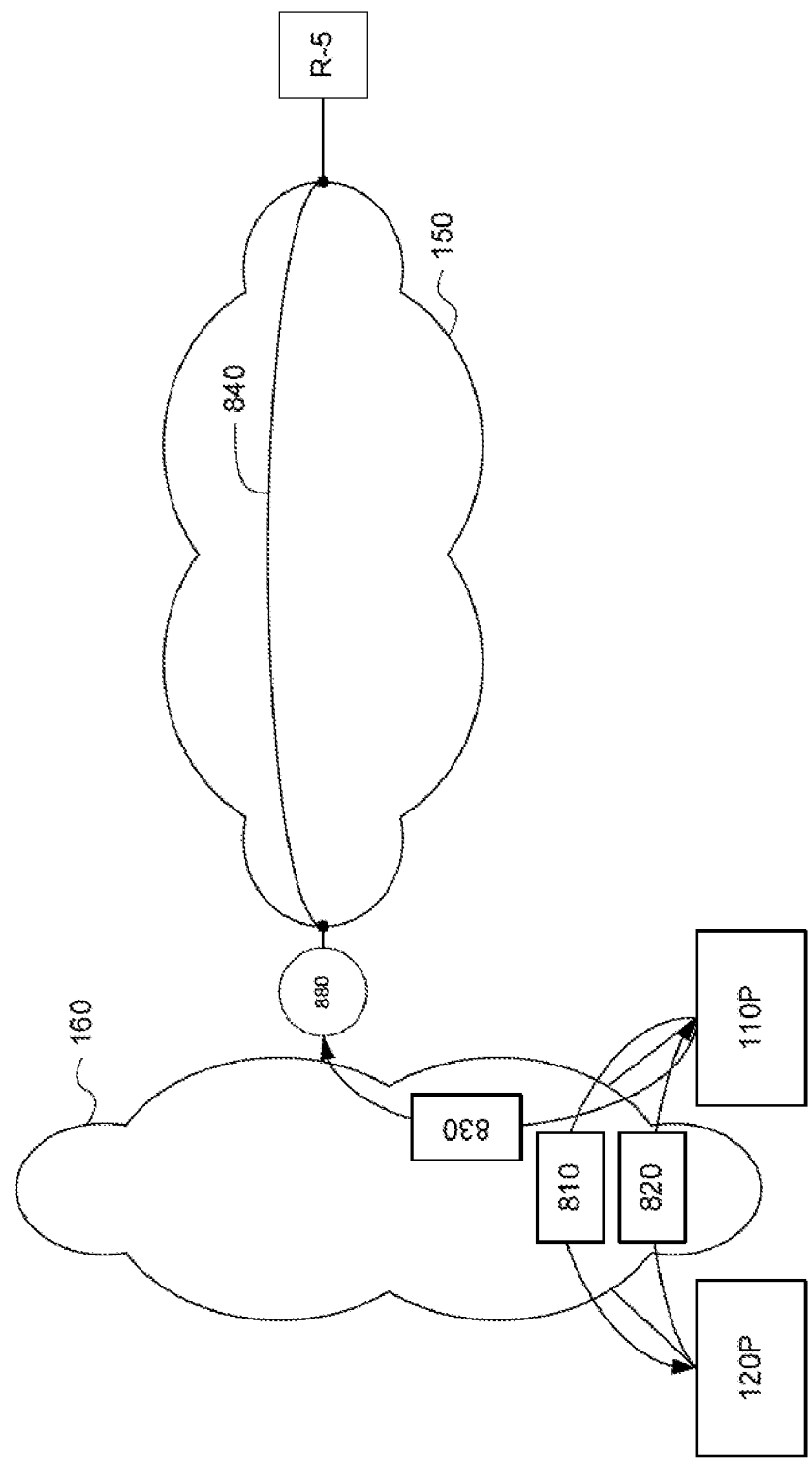
FIG. 8 is another pictorial diagram of a system in accordance with aspects of the disclosure.

In one embodiment, a user operating a device within a private network may want to access a publically available resource, for example, some resource on a public network such as the Internet. The public resource may be accessible on the public network according to an typical or normal application protocol used by devices accessing the public resource via the public network. In this example, shown in FIG. 8, the device 110P (configured similarly to client device 110) may transmit a request 810 (similar to request 310) for the network location of a public resource R-5 from a local DNS server 120P (configured similarly to DNS server 120). As this DNS server would be accessible by the device within the private network, the local DNS server may be located within the private network.

In response, the server may identify a network address, as described above. If the network address is located in a publically accessible network space outside of the private network (or not within the private network's RPC 1918 space), the server may identify a reachability method and generate additional data as described above. This additional data may identify a bastion host, such as bastion host 880 (configured similarly to bastion host 180) through which the user's device may access the public resource. A response 820 (similar to response 410) including a DNS resource record for resource R-5 as well as the additional data may be transmitted to device 110P. As noted above, the additional data may also be encrypted by the DNS 120P and decrypted by the client device 110P.

The user's device may then transmit a request 830 to bastion host 880 to access the public resource R-5. For example, the client device may use authentication method identified in the additional data to authenticate itself to the bastion host as described above. Bastion host 880 may establish a tunnel connection 840 between the bastion host and the device 110P. The bastion host may also access the public resource according to the normal application protocol for the public resource. The client device may use the tunnel connection to communicate with the bastion host and access the public resource. In one example, the tunnel connection between the client device and the bastion host may be a group or groups of encapsulated application protocol packets. This encapsulation may be removed, decrypted, or otherwise processed by the bastion host in order to remove the encapsulation before the packets are sent to the public resource over the public network as the encapsulation would not be needed on the public network. This may allow the client device to access the public resource where the normal application protocol for the public resource is not permitted within the private network.

This arrangement for accessing public resources from a private network location may be useful in various situations. For example, it may be an alternate method for provisioning instant messaging proxies, such as where instant messaging proxies are required to be logged by regulatory or other administrative requirements.

Figure 9:
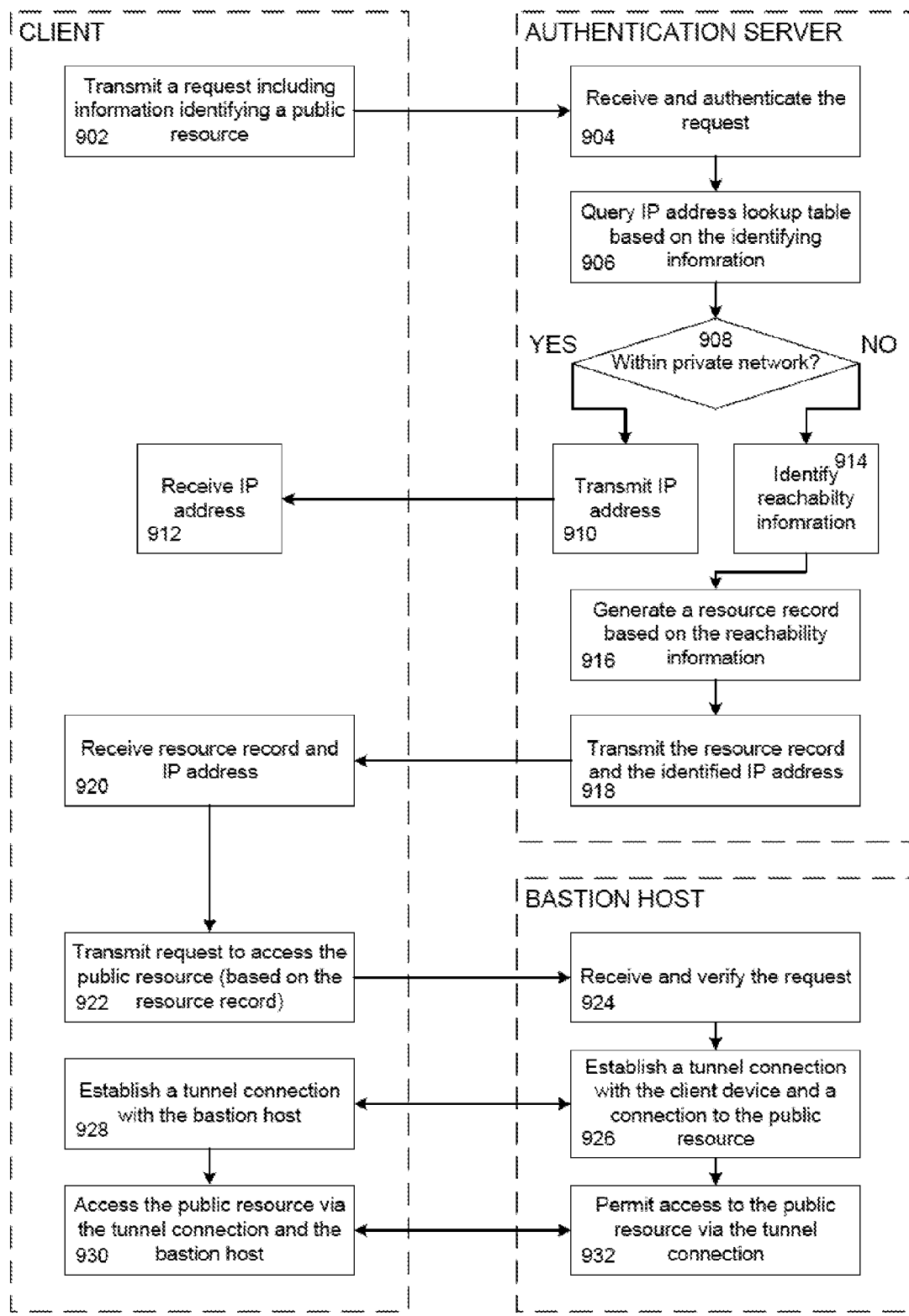
FIG. 9 is another flow diagram in accordance with aspects of the disclosure.

FIG. 9 is an example flow diagram depicting some of the features of the process described above. For example, a client device at a network location associated with a private network transmits a request including information identifying a public resource at block 902. An authentication server, also at a network location associated with the public network, receives and authenticates the request as described above. The authentication server then queries an IP address lookup table to identify an IP address of the public resource based on the identifying information of the request at block 908. The authentication server then determines whether the IP address denotes a network location that is within the private network at block 908. If so, the authentication server transmits the IP address back to the requesting client device at block 910. The client device receives the IP address at block 912. In this example, the resource is not actually a public resource, but a resource accessible within the private network by the client device by using the IP address received from the authentication server.

Returning to block 908, if the IP address is not within the private network, the authentication server identifies reachability information at block 914. As described above, the reachability information may identify a bastion host, a port, and a connection method. The reachability information is then used to generate a resource record including additional information identifying the reachability information at block 916. As noted above, the additional data portion of the resource record may also be encrypted. Next, the resource record and the identified IP address are transmitted to the client device at block 918.

The client device then receives the resource record and the IP address at block 920. If the additional data is encrypted, the client device may decrypt the additional data. The client device transmits a request to access the public resource based on the information of the resource record at block 922. This request is then received by the bastion host (identified in the resource record) and verified at block 924. The bastion host then establishes a tunnel connection with the client device and accesses the public resource according to the application protocol for the public resource at blocks 926 and 928. The client device then uses the tunnel connection and the bastion host to access the public resource and the bastion host that permits access to the public resource at blocks 930 and 932.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting the invention to the specific examples; rather, the examples are intended to illustrate only one of many possible embodiments. Further, the same reference numbers in different drawings may identify the same or similar elements.

The invention claimed is:

1. A computer-implemented method for accessing a publically available resource of a first, public network, the method comprising:
   transmitting, over a second, private network, a request identifying the public resource;
   receiving, from an authentication server, information identifying a bastion host, a port, and a connection method;
   generating, by a processor, a request to access the public resource based on the connection method;
   transmitting the request to the port in order to establish a tunnel connection between the bastion host and a client device; and
   accessing the public resource via the tunnel connection with the bastion host.

2. The method of claim 1, wherein the authentication server is a domain name server that provides network addresses in response to queries from client devices associated with network locations within the first, private network.

3. The method of claim 1, wherein the second network includes shared network space.

4. The method of claim 1, wherein the authentication server is a local domain name server computer located within the second network.

5. The method of claim 1, further comprising, wherein the received information is encrypted and the method further comprises, before generating the request, decrypting the received information.

6. The method of claim 1, wherein the tunnel connection includes one or more groups of encapsulated application protocol packets.

7. The method of claim 1, wherein accessing the public resource via the tunnel connection allows the client device to utilize instant messaging proxies.

8. A computer-implemented method for providing a resource record for reaching a public resource of a first, public network, the method comprising:
   receiving, by one or more server computers, over a second, private network from a client device, a request identifying the public resource;
   querying, by the one or more server computers, memory to identify a network address of the public resource;
   determining, by the one or more server computers, whether the public resource is within the second network based on the identified network address;
   when the protected resource is not within the second network, identifying, by the one or more server computers, reachability information for the public resource from the first network;
   when the public resource is not within the second network generating, by the one or more server computers, additional information based on the identified reachability information, the additional information identifying (1) a bastion host through which the client device is able to reach the public resource from the second network and (2) a port for the bastion host, (3) and a connection method that the client device can use to access the public resource from the second network; and
   transmitting, by the one or more server computers, the additional information and the network address as a resource record to the client device in order to allow the client device to use a tunnel connection to access the public resource.

9. The method of claim 8, further comprising, before transmitting the additional information, encrypting the additional information to obtain encrypted additional information, and wherein transmitting the additional information includes transmitting the encrypted additional information.

10. The method of claim 8, wherein the one or more server computers are local domain name server computers located within the second network.

11. A system for accessing a publically available resource of a first, public network, the system comprising a client computing device having one or more processors configured to:
   transmit, over a second, private network, a request identifying the public resource;
   receive, from an authentication server, information identifying a bastion host, a port, and a connection method;
   generate, a request to access the public resource based on the connection method;
   transmit the request to the port in order to establish a tunnel connection between the bastion host and a client computing device; and
   access the public resource via the tunnel connection with the bastion host.

12. The system of claim 11, wherein the authentication server is a domain name server that provides network addresses in response to queries from client computing devices associated with network locations within the first, private network.

13. The system of claim 12, wherein the authentication server is a local domain name server computer located within the second network.

14. The system of claim 11, further comprising the authentication server.

15. The system of claim 14, wherein the authentication server includes one or more processors configured to:
   receive, via the second network, the request identifying the public resource;
   query memory to identify a network address of the public resource;
   determine, whether the public resource is within the second network based on the identified network address;
   when the public resource is not within the second network, generate information identifying the bastion host, the port, and the connection method; and
   transmit the information to the client computing device.

16. The system of claim 11, further comprising, wherein the received information is encrypted and the method further comprises, before generating the request, decrypting the received information.

17. The system of claim 11, wherein the tunnel connection includes one or more groups of encapsulated application protocol packets.

18. The system of claim 11, wherein accessing the public resource via the tunnel connection allows the client computing device to utilize instant messaging proxies.

* * * * *